US007712082B2

(12) United States Patent
Broman et al.

(10) Patent No.: US 7,712,082 B2
(45) Date of Patent: May 4, 2010

(54) PROFILER STACKWALKER

(75) Inventors: David M. Broman, Redmond, WA (US);
Jonathan W. Keljo, Seattle, WA (US);
Sean Selitrennikoff, Sammamish, WA (US); Shrikrishna V. Borde, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1104 days.

(21) Appl. No.: 11/088,508

(22) Filed: Mar. 24, 2005

(65) Prior Publication Data

US 2006/0218562 A1   Sep. 28, 2006

(51) Int. Cl.
*G06F 9/44* (2006.01)
*G06F 11/00* (2006.01)

(52) U.S. Cl. .................... 717/127; 717/128; 719/328
(58) Field of Classification Search ................ 717/124, 717/127, 128; 719/328
See application file for complete search history.

(56) References Cited

U.S. PATENT DOCUMENTS 6,487,652 B1 * 11/2002 Gomes et al. ................ 712/23

2004/0261065 A1 * 12/2004 Abrams et al. ............... 717/140

OTHER PUBLICATIONS

David Stutz, Ted Neward, and Geoff Shilling, "Shared Source CLI Essentials," Mar. 2003, O'Reilly & Associates, pp. 1-7.*
Michel Cierniak, Marsha Eng, Neal Glew, Brian Lewis, James Stichnoth, "The Open Runtime Platform: A Flexible High-Performance Managed Runtime Environment," Intel Technology Journal, vol. 07 Issue 01, Feb. 19, 2003, 16 pages.*

* cited by examiner

*Primary Examiner*—Li B Zhen
(74) *Attorney, Agent, or Firm*—Toler Law Group

(57) ABSTRACT

A call stack includes at least one frame of managed code and at least one frame of unmanaged code. In a multithreaded environment, a request from a diagnostic tool to a tracing function for the call stack is made on a thread that is not associated with the call stack. The tracing function preserves a context for a thread associated with the call stack until the call stack tracing function ends. In a particular embodiment, a method grants access to a stackwalking function, such that when a point on the call stack is designated in a request for the stackwalking function, the stackwalking function commences at the point on the call stack. When no point on the call stack is designated in the request for the stackwalking function, a default position on the call stack is determined based on a last managed frame pushed onto the call stack and the stackwalking function commences at the default position on the call stack.

12 Claims, 4 Drawing Sheets

PROFILER STACKWALKER

DRAWINGS

The detailed description refers to the following drawings.

DETAILED DESCRIPTION

Profiler stackwalking in a managed execution environment is described herein. More particularly, the description pertains to example implementations for a managed execution environment to expose stackwalking functionality in response to a profiler request for a stackwalk on a call stack in the managed execution environment.

A stackwalk may refer to reporting or disclosing a sequence of frames on a call stack, which may refer to a reserved amount of memory that tracks a sequence of methods called in an application or program. Each disclosed frame may refer to at least one of a method, routine, instruction pointer, register value, and a function name that have been pushed on the call stack.

Figure 1:
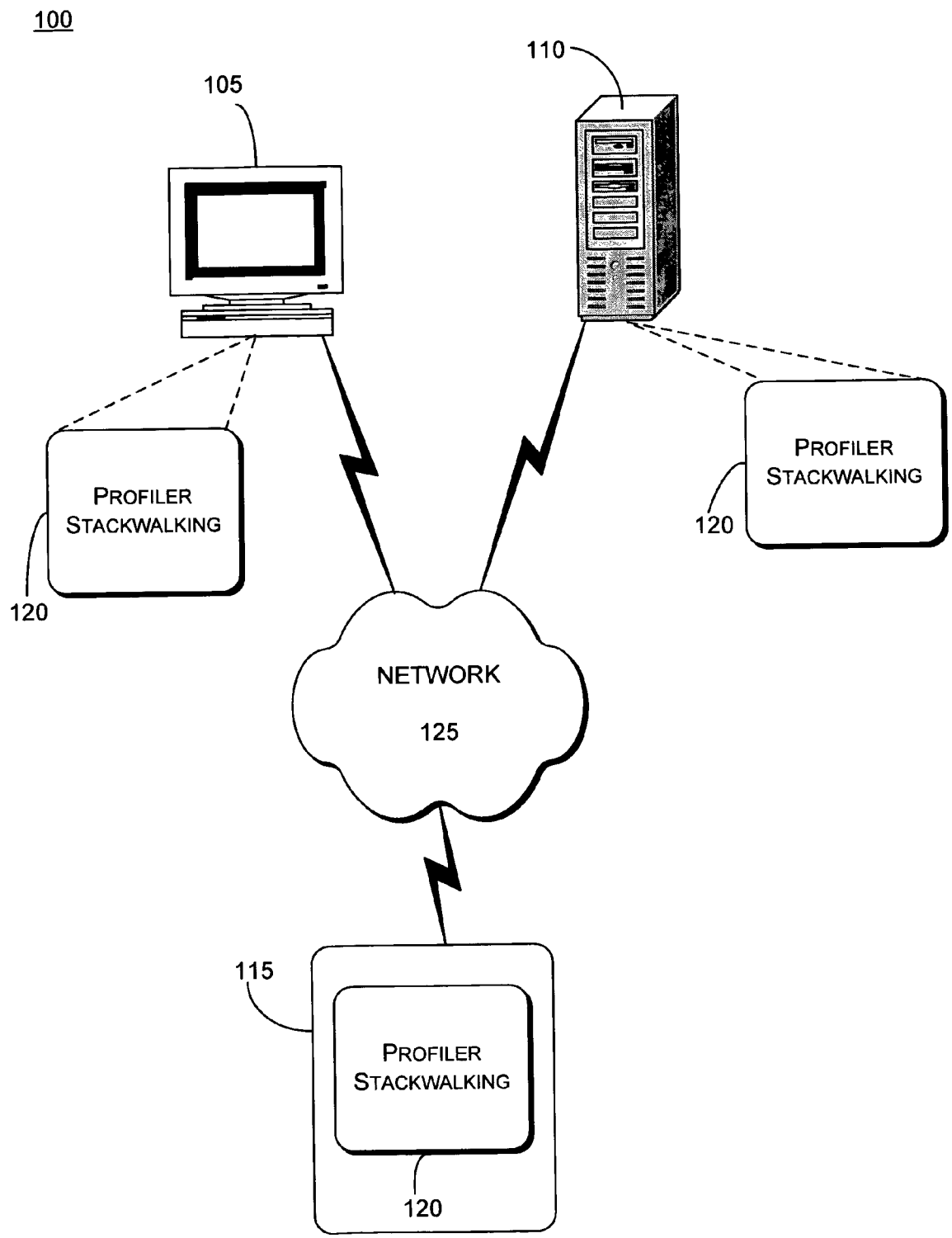
FIG. 1 shows a network environment in which examples of profiler stackwalking may be implemented.

FIG. 1 shows example network environment 100 in which profiler stackwalking may be implemented. However, implementation of profiler stackwalking, according to at least one example, is not limited to network environments. Regardless, in FIG. 1, any one of client device 105, server device 110, and "other" device 115, which may be communicatively coupled to one another via network 125, may be capable of implementing profiler stackwalking 120, as described herein.

Client device 105 may be at least one of a variety of conventional computing devices, including a desktop personal computer (PC), workstation, mainframe computer, Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality to client device 105 or "other" device 115. The data may be publicly available or alternatively restricted, e.g., restricted to only certain users or only if an appropriate subscription or licensing fee is paid. Server device 110 may be at least one of a network server, an application server, a web blade server, or any combination thereof. Typically, server device 110 is any device that may be a content source, and client device 105 is any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may be any further device that is capable of implementing profiler stackwalking 120 according to one or more of the examples described herein. That is, "other" device 115 may be any software-enabled computing or processing device that is capable of implementing profiler stackwalking for an application, program, function, or other assemblage of programmable and executable code, across an interface between a managed execution environment and another execution environment, with the other execution environment being either one of a managed and an unmanaged execution environment. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies, which may include any wired and/or wireless network. Network 125 may further utilize any of a variety of conventional network protocols, including public and/or proprietary protocols. For example, network 125 may include the Internet, an intranet, or at least portions of one or more local area networks (LANs).

Figure 2:
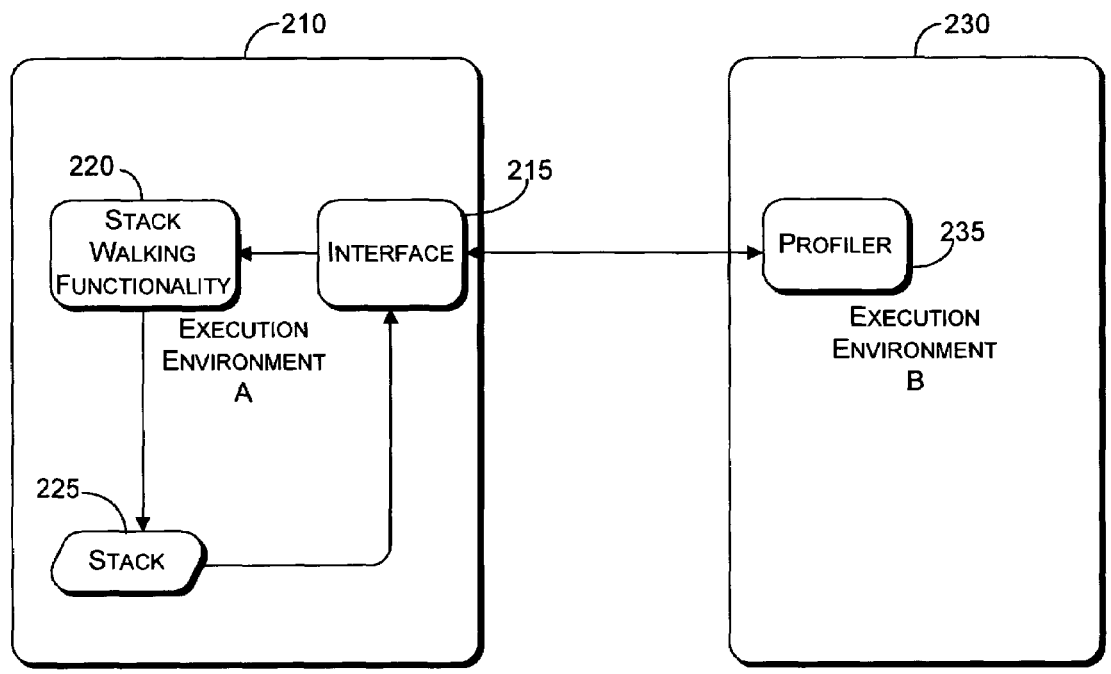
FIG. 2 shows an example of execution environment interaction in accordance with at least one implementation of profiler stackwalking.

FIG. 2 provides overview 200 illustrating execution environment interaction for implementing examples of profiler stackwalking 120 (see FIG. 1). More particularly, FIG. 2 illustrates at least one example implementation for exposing stackwalking functionality in a managed execution environment to a profiler diagnostic tool, which may or may not be from another execution environment. Stackwalking functionality may alternatively be referred, hereafter, as stack tracing or derivatives thereof; although no limitations should be inferred by or implied by the nomenclature utilized to describe the functionality.

The aforementioned "another execution environment" may be either another managed execution environment, an unmanaged execution environment, or even the same execution environment. For the purpose of describing example implementations of profiler stackwalking 120, execution environment A 210 may be regarded as a managed execution environment and execution environment B 230 may be regarded as an unmanaged execution environment, which may include an operating system. Significance may be given to this scenario of execution environment interaction because profiler stackwalking of a call stack in a managed execution environment has typically been hindered due to the proprietary nature of methods on a call stack in the managed execution environment.

Execution environment A 210 and execution environment B 230 may be contained within the same process. However, in at least one alternative implementation, execution environment A 210 and execution environment B 230 may be contained in different processes.

Execution environment A 210 may be a managed execution environment (alternatively referred to as a "runtime execution environment"), examples of which may include: Visual Basic runtime execution environment; Java® Virtual Machine runtime execution environment that is used to run, e.g., Java® routines; or Common Language Runtime (CLR) to compile, e.g., Microsoft .NET™ applications into machine language before executing a called routine.

Managed execution environments may provide routines for application programs to perform properly in an operating system because application programs require another software system in order to execute. Thus, an application program may call one or more managed execution environment routines, which may reside between the application program and the operating system, and the runtime execution environment routines may call the appropriate operating system routines.

Managed execution environments have been developed to enhance the reliability of software execution on a growing range of processing devices including servers, desktop computers, laptop (ie., notebook) computers, and a host of mobile processing devices (PDAs and mobile smart phones). Managed execution environments may provide a layer of abstraction and services to an application program running on a processing device, and further provide such an application program with capabilities including error handling and automatic memory management.

Interface 215 may refer to an application programming interface (alternatively referred to as an "API") that may expose stackwalking functionality 220 to a profiler diagnostic tool. In the context of the example implementations described herein, interface 215 may be regarded as a language and message format provided by managed execution environment 210 to enable profiler 235 in execution environment B 230 to communicate with stackwalking functionality in execution environment A 210. According to at least one example implementation of profiler stackwalking 120, interface 215 may be an API that is a subset of a full profiling API.

Stackwalking functionality 220 may refer to an application or program module capable of performing a stackwalk by disclosing or reporting at least one frame of a call stack in execution environment A 210 to requesting profiler 235 in execution environment B 230. Each disclosed frame may refer to at least one of a method, routine, instruction pointer, register value, and a function name that have been pushed on call stack 225. However, for the sake of the present description, references to frames will pertain to methods, although such references are provided as examples only, and are not intended to limit the implementations described herein in any manner.

According to at least one example implementation of profiler stackwalking 120, a function call (i.e., request) from profiler 235 to stackwalking functionality 220 may initiate a stackwalk on call stack 225. During the course of the stackwalk, a callback function may be called once for each frame found on-call stack 225.

Call stack 225 may refer to a reserved amount of memory that tracks a sequence of methods called in an application or program. As each method on call stack 225 is completed, a processor may return control to a calling method all the way back to the first method that began the sequence. Such call stacks may be regarded as "last-in, first-out," meaning that the most recent item pushed (i.e., placed) on a call stack may be the first item removed from the call stack.

Execution environment B 230 may refer to an unmanaged execution environment, which may typically include an operating system, outside of managed execution environment A 210.

Profiler 235 may refer to a profiling application as viewed by unmanaged execution environment B 230.

When profiler 235 requests a stackwalk (i.e., stack trace) on call stack 225, profiler 235 may instantiate a request on interface 215 (e.g., DoStackSnapshot). Such instantiation may or may not include a seed, which may refer to a starting point at which the requested stackwalk is specified to begin. Alternatively, such instantiation may further include a range of frames on call stack 225 on which the stackwalk is to be executed. Subsequently, one or more frames from call stack 225 may be disclosed or reported to profiler 235 from interface 215 as part of a callback method (e.g., StackSnapshotCallback).

It is noted that the nomenclature associated with the APIs throughout the present description is provided as an example only, and is not intended to be limiting in any manner. Such interfaces may have different references with the same, or similar, effect.

Figure 3:
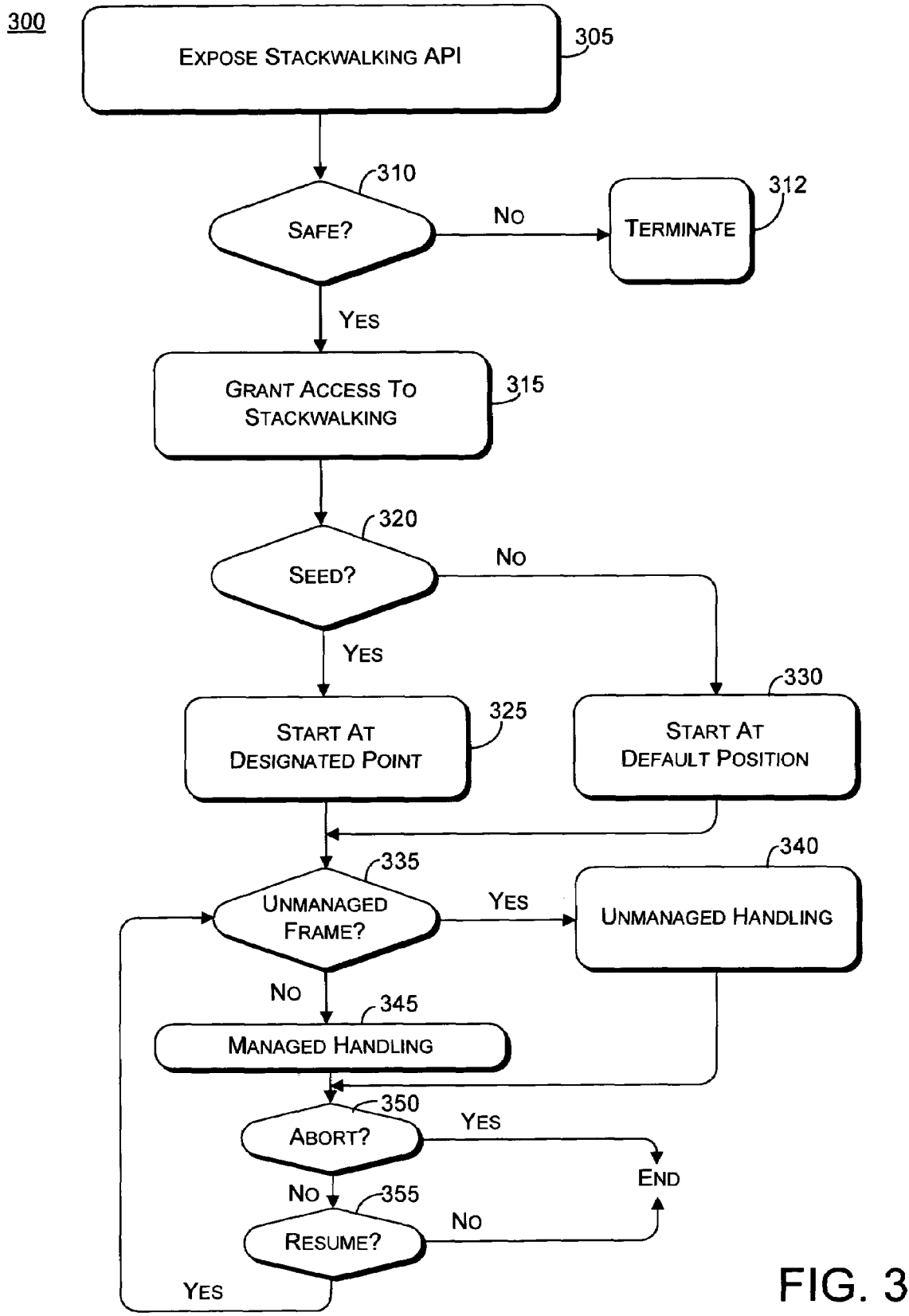
FIG. 3 shows an example processing flow associated with at least one implementation of profiler stackwalking.

FIG. 3 shows example processing flow 300 associated with at least one implementation of profiler stackwalking 120 (see FIG. 1). Processing flow 300 is described below with reference to features of FIGS. 1 and 2.

Block 305 may refer to interface 215 in execution environment A 210 exposing stackwalking functionality 220 to profiler 235 in execution environment B 230.

Decision 310 may refer to execution environment A 210 determining whether safe conditions exist for stackwalking functionality 220 to be implemented. If safe conditions do not exist, processing flow 300 terminates at block 312. In the alternative, however, execution environment A 210 may typically perform one or more checks to ensure that stackwalking functionality 120, as requested by profiler 235, may be safely implemented. An example of such checks may include analyzing one or more of the threads involved in the requested stackwalking.

In the example implementations described herein, reference to a "source thread" may be directed toward a thread on which profiler 235 requests stackwalking functionality 220. Further, since a call stack may be regarded as being associated with a thread that contains the call stack, reference to a "target thread" may be directed toward a thread associated with the call stack for which profiler 235 has requested stackwalking functionality 220 be implemented.

Execution environment A 210 determines whether stackwalking functionality 220 initiates from a "safe point" on the target thread. Further checks for the existence of safe conditions for a stackwalk may be required depending on the relationship between the source thread and the target thread.

Accordingly, decision 310 may result in a determination that stackwalking functionality 220 is not safe, meaning that invocation thereof may be disruptive to execution of an application on which stackwalking functionality 220 is operating. Further, stackwalking functionality 220 may be deemed to be disruptive to execution of the target thread, meaning invocation of stackwalking functionality 220 may potentially be catastrophic to the execution of the application.

Thus, processing flow 300 may terminate at block 312, for example, by execution environment A 210 refusing to grant profiler 235 with the requested access to stackwalking functionality 220.

Block 315 may refer to execution environment A 210 granting profiler 235 with access to stackwalking functionality 220 upon positive decision 310.

Decision 320 may refer to execution environment A 210 determining whether an instantiated request by profiler 235 for stackwalking functionality 220 includes a starting point at which the requested stackwalk is to begin, relative to call stack 225. Such starting point is described above as a seed, although such terminology is provided only as an example.

Block 325, subsequent to positive decision 320, may refer to stackwalking functionality 220 being initiated at a frame of call stack 225 designated in the seed.

Block 330, subsequent to negative decision 320, may refer to stackwalking functionality 220 starting at a default position on call stack 225. The default position may be the last frame pushed on-call stack 225 or even the last managed frame pushed on call stack 225. Such default positions are provided as examples only, and are not intended to limit the scope of the example implementations described herein.

One or more implementations of stackwalking functionality 220 may include execution environment A 210 utilizing a callback method (e.g., StackSnapshotCallback) to provide one or more frames on call stack 225 to profiler 235 in a last in-first out (ie. "LIFO") manner. That is, each subsequent frame of call stack 225 reported to profiler 235 may refer to a method that called the previously reported method.

Decision 335 may refer to a determination that the stackwalk on call stack 225 has encountered a frame consisting of unmanaged code. More specifically, when call stack 225 is a "mixed-mode" call stack having managed and unmanaged methods pushed thereon, the stackwalk on call stack 225 may encounter one or more unmanaged frames. Upon detecting a transition from a frame having a method consisting of managed code to a frame having a method consisting of unmanaged code on call stack 225, stackwalking functionality 220 may detect a marker at or near the point of transition indicating at least the context (ie., attributes) of the method consisting of unmanaged code.

Block 340, subsequent to positive decision 335, may refer to profiler 235 handling unmanaged code on call stack 225. Such unmanaged handling may include executing known heuristics for performing a stackwalk for a method consisting of unmanaged code. Processing flow 300 shows block 340 performing one or more known heuristics for a stackwalk on a method consisting of unmanaged code on mixed-mode call stack 225 in a linear manner. However, according to at least one alternative implementation of processing flow, block 340 may include caching the marker that indicates at least the context of the method consisting of unmanaged code and returning to perform one or more known heuristics for the stackwalk on the frame having a method consisting of unmanaged code after the stackwalk has been completed with regard to frames having methods consisting of managed code on call stack 225.

Block 345 may refer to profiler 235 handling managed code on call stack 225.

Decision 350 may refer to a determination by profiler 235 to terminate the stackwalk. Positive decision 350 may result in processing flow 300 terminating.

Decision 355, resulting from negative decision 350, may refer to execution environment A 210 determining whether frames remain to be stackwalked on call stack 235. Negative decision 355 may result in processing flow 300 terminating. Positive decision 355 may result in processing flow 300 resuming at decision 335.

Figure 4:
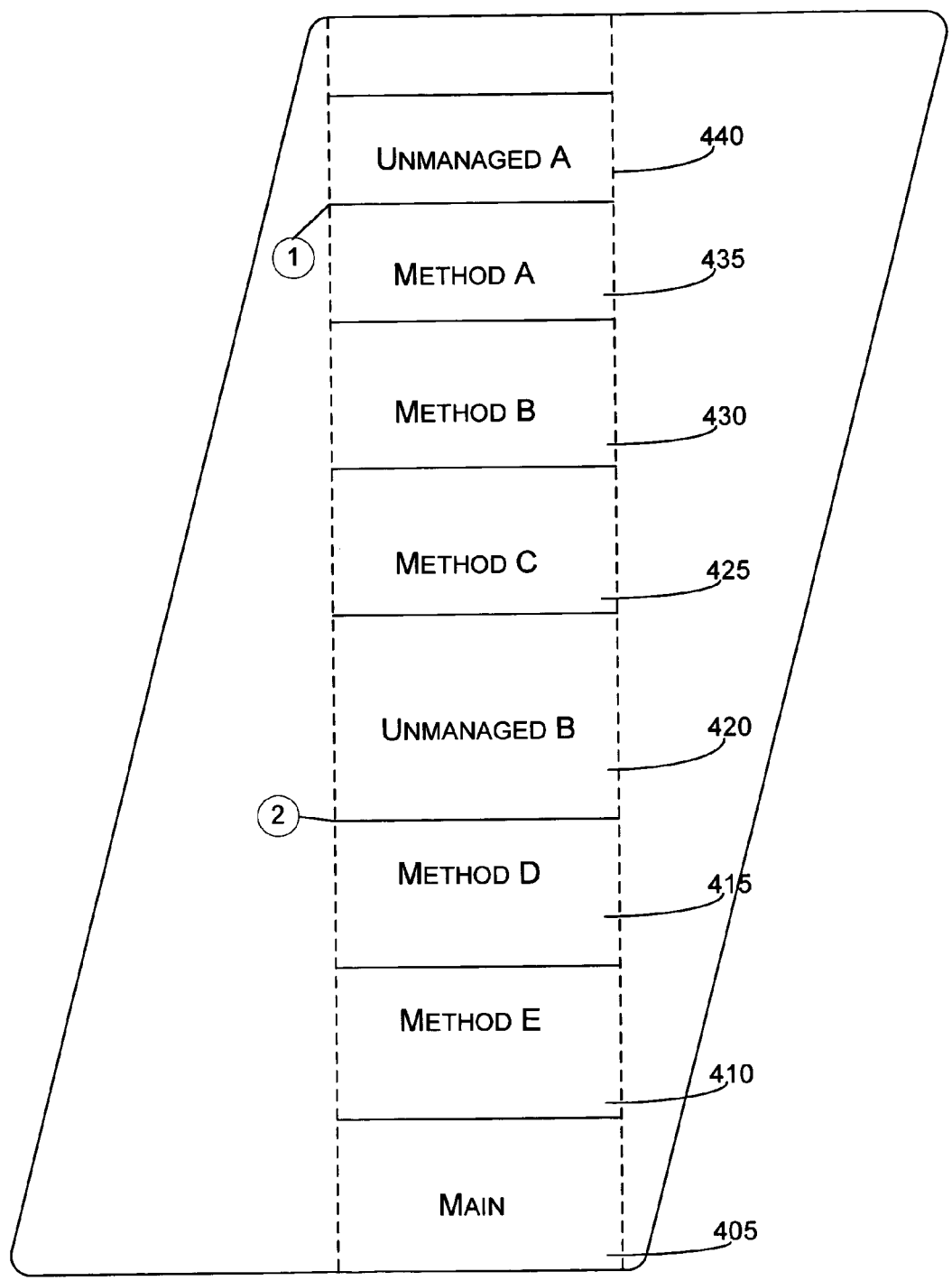
FIG. 4 shows an example call stack associated with at least one implementation of profiler stackwalking.

FIG. 4 shows example call stack 225 to illustrate effects of stackwalking functionality on a call stack in accordance with the example embodiments described with reference to FIGS. 1-3.

Call stack 225 may refer to a reserved amount of memory having a sequence of frames having methods consisting of managed and unmanaged code. Thus, call stack 225 may be referred to as a mixed-mode call stack, although the examples described herein may also apply to call stack 225 having a sequence of frames having methods consisting of only managed code.

Call stack 225 includes main method 405; main method 405 calls method E 410; method E 410 calls method D 415; method D 415 calls unmanaged B 420, which is a method consisting of unmanaged code; unmanaged B 420 calls method C 425; method C 425 calls method B 430; method B 430 calls method A 435; and method A 435 calls unmanaged A 440, which is a method consisting of unmanaged code. Unless specified, it may be assumed that the methods on call stack 225 consist of managed code.

Call stack 225 may be regarded as a LIFO call stack, although the examples described herein are not limited to such embodiments. Accordingly, a stackwalk on call stack 225, implementing stackwalking functionality 220, may be conducted downward from the most recently called method (unmanaged A 440) down towards main method 405. Therefore, via interface 215, stackwalking functionality 220 may report frames including the methods 440-405 to profiler 235. Typically, frames may be reported to profiler 235 on a frame-by-frame basis, although alternative embodiments of stackwalking functionality may contemplate more than one frame being reported to profiler 235, as requested thereby.

As profiler 235 submits a request for stackwalking functionality 220, the request may include a seed indicating that the requested stackwalk is to begin from a frame corresponding to a particular one of methods 440-405. Thus, the stackwalk may begin at any frame corresponding to methods 440-405. Further, the request may optionally indicate the range or number of frames on which the stackwalk is to be implemented.

However, if the request does not include a seed, the stackwalk on stack 225 may begin at a default position such as, e.g., the last frame pushed on call stack 225, which is unmanaged A 440. It is unlikely, though not necessarily prohibited, that a stackwalk on call stack 225 would begin with a frame having a method consisting of unmanaged code because the context is likely to be unknown, and therefore an error code may be returned in response to the request for stackwalking functionality 220. Therefore, it is more likely that a stackwalk on call stack 225 may begin on the last managed frame that is pushed on call stack 225, which is method A 435 in the example of FIG. 4.

Further, a stackwalk on call stack 225 may detect markers 1 and 2 as the stackwalk proceeds from a frame having a method consisting of unmanaged code to a frame having a method consisting of managed code. Markers 1 and 2 may be left by execution environment A 210 for internal purposes.

Profiler 235 may know where to perform one or more known heuristics for performing a stackwalk on a frame having a method consisting of unmanaged code on call stack 225 based on information provided by execution environment A 210 as stackwalking functionality 220 proceeds from a method consisting of managed code to a method consisting of unmanaged code.

By the examples described above, profiler stackwalking in a managed execution environment may be implemented. More particularly, a managed execution environment may expose stackwalking functionality in response to a profiler request for a stackwalk on a call stack in the managed execution environment.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "an implementation," "implementations," or "an example implementation" meaning that a particular described feature, structure, or characteristic is included in at least one example of the present invention. Thus, usage of such phrases may refer to more than just one example or example implementation. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementation and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method, comprising:
    exposing a stackwalking function associated with a call stack in a managed execution environment, the call stack including at least one frame of managed code and at least one frame of unmanaged code;
    wherein a request to the stackwalking function for the call stack is made on a thread not associated with the call stack, and wherein the stackwalking function preserves a context for a thread associated with the call stack until the stackwalking function ends;
    granting access to the stackwalking function, wherein granting includes:
    when a point on the call stack is designated in a request for the stackwalking function, allowing the stackwalking function to commence at the point on the call stack, and
    when no point on the call stack is designated in the request for the stackwalking function, determining a default position on the call stack by determining a last managed frame pushed onto the call stack and allowing the stackwalking function to commence at the default position on the call stack, the default position being the last managed frame pushed onto the call stack; and
    performing the stackwalking function.

2. The method of claim 1, wherein the exposing includes exposing a call stack profiling API (application program interface) to an application in an operating system.

3. The method of claim 1, wherein the granting includes, in response to a call for the stackwalking function, determining that conditions for the stackwalking function are safe.

4. The method of claim 1, wherein the granting includes allowing the stackwalking function to be executed for a predetermined number of frames specified in a request for the stackwalking function.

5. The method claim 1, wherein the performing includes stackwalking the call stack on a thread that is different than a thread associated with the request for the stackwalking function.

6. A computer storage medium having one or more executable instructions that, when read, cause one or more processors to:
    enable a diagnostic tool from an unmanaged execution environment to call a call stack tracing function for a call stack in a managed execution environment, the call stack including at least one frame of managed code and at least one frame of unmanaged code;
    wherein a request from the diagnostic tool to the call stack tracing function for the call stack is made on a thread not associated with the call stack, and wherein the call stack tracing function preserves a context for a thread associated with the call stack until the call stack tracing function ends;
    determine that the thread associated with the call stack is in a safe state;
    provide the diagnostic tool with access to the call stack tracing function; and
    execute the call stack tracing function on the call stack, wherein executing includes:
    determining whether a request for the call stack tracing function includes a point on the call stack indicated a beginning point for the call stack tracing function,
    when the request includes the point, beginning the call stack tracing function at the point, and
    when the request does not include the point, beginning the call stack tracing function at a default position on the call stack, the default position being a last managed frame pushed onto the call stack.

7. The computer storage medium of claim 6, wherein the one or more instructions to enable a diagnostic tool from the unmanaged execution environment to call the call stack tracing function in the managed execution environment cause the one or more processors to expose a call stack tracing API to the diagnostic tool.

8. The computer storage medium of claim 6, wherein the one or more instructions to determine that the active thread for the call stack is in a safe state cause the one or more processors to verify that a trace of the call stack would not interfere with consistent processing in a target call stack.

9. The computer storage medium of claim 6, wherein the one or more instructions to trace the call stack cause the one or more processors to trace the call stack for a number of frames specified by a request for the call stack tracing function from the diagnostic tool.

10. The computer storage medium of claim 6, wherein the one or more instructions to trace the call stack cause the one or more processors to detect a marker including context for a method consisting of unmanaged code.

11. A system, comprising:
  means for exposing stackwalking functionality in a managed execution environment to a profiler;
  means for receiving a request from the profiler to perform the stackwalking functionality on a call stack, the call stack including at least one frame of managed code and at least one frame of unmanaged code;
  wherein the request from the profiler to perform the stackwalking functionality on the call stack is made on a thread not associated with the call stack, and wherein the stackwalking functionality preserves a context for a thread associated with the call stack until the stackwalking functionality ends; and
  means for performing the stackwalking functionality on the call stack, the means for performing including:
    means for determining whether a request for the stackwalking functionality includes a point on the call stack indicated a point at which to begin performing the stackwalking functionality,
    means for performing the stackwalking functionality beginning at the point when the request includes the point, and
    means for performing the stackwalking functionality beginning at a default position on the call stack when the request does not include the point, the default position being a last managed frame pushed onto the call stack.

12. The system of claim 11, wherein the stackwalking functionality is an instantiation of a profiling class.

* * * * *